United States Patent
Winterot et al.

(10) Patent No.: US 7,643,216 B2
(45) Date of Patent: *Jan. 5, 2010

(54) MICROSCOPE OBJECTIVE

(75) Inventors: Johannes Winterot, Jena (DE); Dirk Jahn, Jena (DE); Renhu Shi, Goettingen (DE); Ingo Fahlbusch, Goettingen (DE)

(73) Assignee: Carl Zeiss Microimaging GmbH, Jena (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/664,553

(22) PCT Filed: Sep. 28, 2005

(86) PCT No.: PCT/EP2005/010473

§ 371 (c)(1),
(2), (4) Date: Jan. 29, 2008

(87) PCT Pub. No.: WO2006/037529

PCT Pub. Date: Apr. 13, 2006

(65) Prior Publication Data

US 2008/0310030 A1     Dec. 18, 2008

(30) Foreign Application Priority Data

Sep. 26, 2005    (DE) ................. 10 2005 046 476

(51) Int. Cl.
*G02B 27/02* (2006.01)
(52) U.S. Cl. .................................. 359/656; 359/661
(58) Field of Classification Search .............. 359/656, 359/657, 658, 659, 660, 661
See application file for complete search history.

(56) References Cited

U.S. PATENT DOCUMENTS

| 5,852,515 | A | 12/1998 | Kurata |
| 6,271,971 | B1 | 8/2001 | Kurata et al. |
| 6,339,507 | B1 | 1/2002 | Yonezawa |

(Continued)

FOREIGN PATENT DOCUMENTS

EP     1 369 729     12/2003

(Continued)

OTHER PUBLICATIONS

XP000683132 Opt.Eng 36(1) Jan. 1997 pp. 201-209, A.S. Murty, et al. "Design of a high-resolution stereo zoom microscope".

(Continued)

*Primary Examiner*—David N Spector
(74) *Attorney, Agent, or Firm*—Reed Smith LLP

(57) ABSTRACT

The invention is directed to an objective, particularly for telescope-type stereomicroscopes. The objective comprises two lens groups, a first lens group and a second lens group. The first lens group, which faces the object plane, has a positive refractive power and comprises a plurality of lenses of which at least two form a cemented component. The second lens group, which is on the image side, has a negative refractive power and comprises a collecting cemented component and a diverging lens. The objective is characterized in that the following conditions $B_1$ and $B_2$ are met:
where $D_{AP}$ represents the diameter of the exit pupil of the objective and $\omega_1$ represents the maximum field angle.

15 Claims, 6 Drawing Sheets

U.S. PATENT DOCUMENTS

2001/0003490 A1  6/2001  Kawasaki et al.
2008/0192338 A1* 8/2008  Winterot et al. ............. 359/376

FOREIGN PATENT DOCUMENTS

JP    2001-147378    5/2001
JP    2001-221955    8/2001

OTHER PUBLICATIONS

XP002355648 Handbuch de Mikroskopie, pp. 346-352, Hermann Beyer and Horst Riesenberg.
XP009013507 SPIE vol. 3482, pp. 690-697, Klaus-Peter Zimmer "Optical Designs for Stereomicroscopes".

* cited by examiner

MICROSCOPE OBJECTIVE

CROSS-REFERENCE TO RELATED APPLICATIONS

This application claims priority of International Application No. PCT/EP2005/010473, filed Sep. 28, 2005, German Application No. 10 2004 048 299.3, filed Oct. 1, 2004 and German Application No. 10 2005 046 476.9, filed Sep. 26, 2005, the complete disclosures of which are hereby incorporated by reference.

BACKGROUND OF THE INVENTION a) Field of the Invention

The invention is directed to a microscope objective, particularly for stereomicroscopes, which has a large pupil diameter and is used with incident brightfield illumination.

b) Description of the Related Art

In telescope-type stereomicroscopes, two separate light channels are guided through one and the same objective in order to achieve a stereoscopic impression. As a result, the dimensions of an objective of this kind, especially with regard to the lens diameter, are significantly larger than those of objectives for conventional microscopes or in Greenough-type stereomicroscopes. In addition, requirements for microscope objectives with regard to the correction of the chromatic aberration, field flattening and prevention of distortion are increasingly demanding.

The objectives are usually used in connection with a focal magnification changers and exchangeable tubes. In order to make it possible to use the microscope at magnifications which allow overview imaging of an object as well as detailed viewing without having to change objectives, objectives are required in which there is more space available for suitable magnification changers in the post-magnification area and which also offer a larger usable aperture in the object space.

The use of fluorescence in stereomicroscopes with incident brightfield illumination places new demands on the design of the objectives. Accordingly, with regard to the devices, it is necessary to separate the beam paths of the excitation of the fluorescence and of the observation in the entrance aperture from the device in the objective. This leads to large apertures. Requirements regarding correction are demanding in objectives of this kind for telescope-type stereomicroscopes. In addition, because of the fluorescence excitation the selection of material is limited with respect to transparency and self-fluorescence of the materials which are employed.

EP 1 369 729 A2 describes an objective for telescope-type stereomicroscopes which comprises three optical lens groups. The first lens group is arranged toward the object side and the third lens group is arranged toward a magnification changer. This objective satisfies certain conditions with resect to the diameter of the entrance pupil of the magnification changer arranged downstream of the objective and of the maximum field angle of the objective at low magnification.

JP 2001-147378 describes an objective which is suitable for use in telescope-type stereomicroscopes. Viewed from the direction of the microscope body, they comprise a first lens group with positive refractive power, a second lens group containing at least one cemented triplet, and a third lens group with positive refractive power. These lens groups can also comprise individual lenses in addition to the cemented components or combinations of individual lenses and cemented components.

JP 2001-221955 describes another objective for telescope-type stereomicroscopes. Viewed from the direction of the microscope body, the objective comprises two lens groups of which a first lens group with positive refractive power contains a biconvex cemented component and a second lens group contains at least two cemented components. In addition to the cemented components, the lens groups can also comprise individual lenses as well as combinations of individual lenses and cemented components.

U.S. Pat. No. 6,271,971 describes an objective for telescope-type stereomicroscopes with the primary aim of optimizing the ratio of mounting space to the objective focal length.

OBJECT AND SUMMARY OF THE INVENTION

Accordingly, it is the primary object of the invention to provide an objective for telescope-type stereomicroscopes in a simple compact construction which satisfies requirements regarding the correction of the chromatic aberration and distortion while meeting the demands for more space for magnification changers and for a larger useful aperture in the object space and which realizes a large working distance and a flat visual field.

This object is met in an objective with two lens groups comprising individual lenses and, in each instance, at least one cemented component, where the conditions $$46.5 < D_{AP} \leq 60 \text{ and} \qquad B_1$$

$$0.16 \leq \tan \omega_1 \qquad B_2$$

are met, $D_{AP}$ represents the exit diameter of the objective and $\omega_1$ represents the angle of the maximum field.

The lens groups can comprise individual lenses, at least one cemented component, or a combination of individual lenses and cemented components.

An advantageous objective has a focal length $f' \geq 40$ mm and $\leq 200$ mm.

It is advantageous when the illumination beam path is coupled into the exit pupil of the objective.

In particular, it is advantageous when the center points of the entrance pupil of the illumination beam path and the center points of the two beam paths of the objective form an isosceles triangle inside the exit pupil of the objective, the center point of the exit pupil lying inside this triangle.

With respect to the exit pupil of the objective, it is advantageous when the following conditions are met:

$$0.25 \leq a_1/D_{AP} \leq 0.5$$

$$0.25 \leq a_2/D_{AP} \leq 0.5$$

$$0.25 \leq a_3/D_{AP} \leq 0.5,$$

where $a_1$ and $a_2$ are the distances of the center points $M_1$ and $M_2$ of the two beam paths of the objective from the center point M of the exit pupil of the objective, and $a_3$ is the distance of the center point $M_3$ of the entrance pupil of the illumination beam path from the center point M of the exit pupil of the objective.

Accordingly, it is also advantageous when the focal length of this second lens group satisfies the following condition:

$$-0.0668 * f'^2 + 7.4933 * f' - 460 \leq f'_2 \leq -0.0668 f'^2 + 7.4933 * f' - 400,$$

where $f'_2$ is the focal length of the second lens group and $f'$ is the total focal length of the objective.

An advantageous objective is also provided when the second lens group comprises a cemented component and an individual lens, and the cemented component is arranged next to the magnification changer and when the focal length of this second lens group satisfies the following condition:

$$-0.0668*f'^2+7.4933*f'-460 \leq f'_2 \leq -0.0668f'^2+7.4933*f'-400,$$

where $f'_2$ is the focal length of the second lens group and $f'$ is the total focal length of the objective. The individual lens is preferably constructed as a meniscus with the convex side facing the object.

It is also advantageous when the cemented component of the second lens group meets the condition:

$$10^{-8}*f'^2+9*10^{-8}*f'-10^{-4} \leq 1/f_1/v_{e1} + 1/f_2/v_{e2} \leq 10^{-8}*f'^2+9*10^{-8}*f'-10^{-4},$$

and lens 2.1 of this lens group meets the condition $v_{e3} \leq 55$, where $f_1$ is the focal length of lenses 2.22, $f_2$ is the focal length of lenses 2.21, $f'$ is the total focal length of the objective, $v_{e1}$ and $v_{e2}$ are the Abbe numbers of lenses 2.22 and 2.21, and $v_{e3}$ is the Abbe number of lens 2.1.

In the inventive construction, the first lens group has a positive refractive power and comprises a plurality of lenses of which at least two form a cemented component. The second lens group has a negative refractive power and comprises a collecting cemented component and a diverging lens.

An advantageous first construction of the objective with a focal length f'=50 mm, an entrance aperture of 55 mm and an aperture ratio of 1:0.9 is realized by the constructional data indicated in claim 10. This first construction comprises two lens groups, wherein considered from the object space, a first lens group with positive refractive power comprises two individual lenses with positive refractive power and a cemented group comprising two lenses, followed by an individual lens with positive refractive power and a second lens group with negative refractive power comprising another individual lens with negative refractive power and a cemented group with positive refractive power comprising two lenses.

An advantageous second construction of the objective with a focal length f'=100 mm, an entrance aperture of 55 mm and an aperture ratio of 1:1.8 is realized by the constructional data indicated in claim 11. This second construction likewise comprises two lens groups, wherein, considered from the object space, a first lens group with positive refractive power comprises a cemented group comprising two lenses and an individual lens with positive refractive power and a second lens group with negative refractive power comprising an individual lens with negative refractive power and a cemented group with positive refractive power comprising two lenses.

A third construction of the objective with a focal length f'=80 mm, an entrance aperture of 55 mm and an aperture ratio of 1:1.45 can be produced by the constructional data indicated in claim 12. This third construction likewise comprises two lens groups, wherein, considered from the object space, a first lens group with positive refractive power comprises two individual lenses with positive refractive power, a cemented group comprising two lenses and another individual lens with positive refractive power, and a second lens group with negative refractive power comprising an individual lens with negative refractive power and a cemented group with positive refractive power comprising two lenses.

An advantageous fourth construction of the objective with a focal length f'=65.59 mm, an entrance aperture of 53.5 mm and an aperture ratio of 1:1.23 can be produced by the constructional data indicated in claim 13. This fourth construction likewise comprises two lens groups, wherein, considered from the object space, a first lens group with positive refractive power comprises two individual lenses with positive refractive power, a cemented group comprising two lenses, and another individual lens with positive refractive power, and a second lens group with negative refractive power comprising an individual lens with negative refractive power and a cemented group with positive refractive power comprising two lenses.

An objective which is advantageously applicable in fluorescence stereomicroscopes is achieved when the condition $\tau(350; 5)_j \geq 0.8$ is met, where $\tau(350; 5)_j$ is the medium-internal transmission at a wavelength of the light of 350 nm and a substrate thickness of 5 mm, and an index j=1, 2, ... stands for all optical media of the objective.

The microscope objective that is provided in this way is particularly suited for use in fluorescence stereomicroscopy with incident brightfield illumination and, above all, offers advantages in this regard over known objectives. Further, there are advantages with respect to the correction of the chromatic aberration, field flattening and distortion as well as with respect to the demand for larger spaces for the magnification changers arranged downstream of the objective and for a larger useful aperture in the object space.

The invention will be described more fully in the following with reference to embodiment examples shown in the drawings.

DESCRIPTION OF THE PREFERRED EMBODIMENTS

Figure 1:
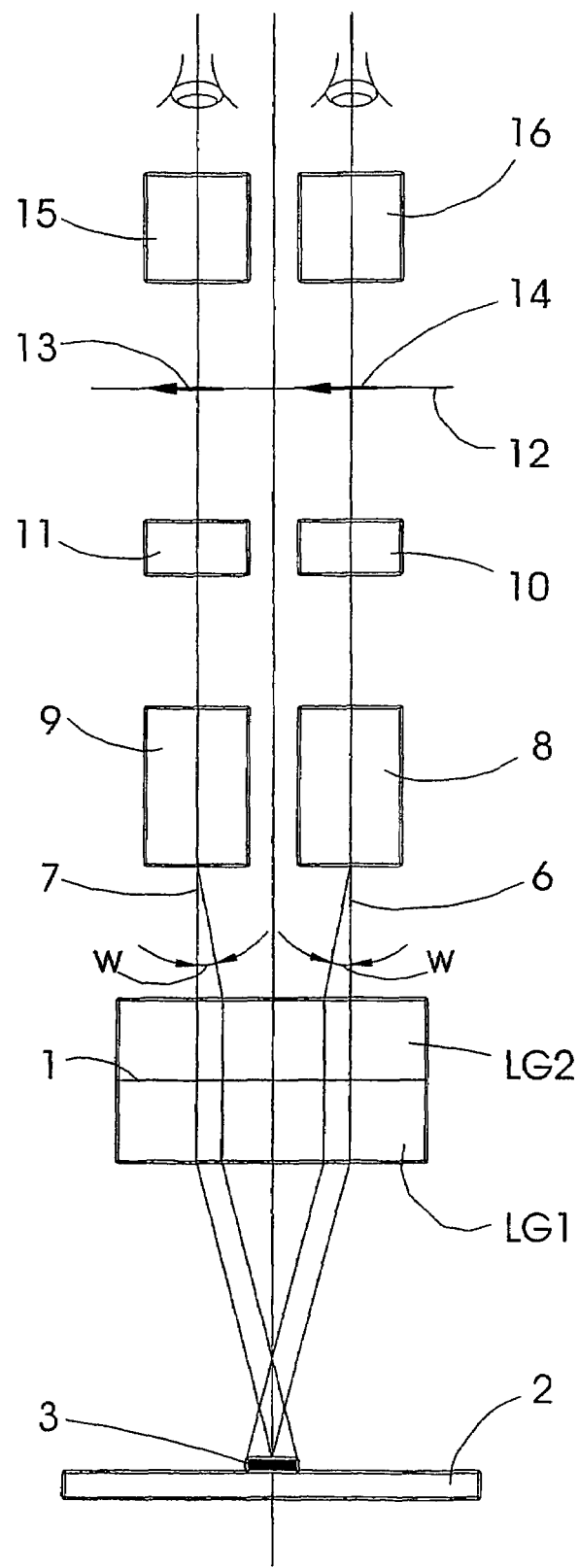
FIG. 1 shows the construction of a telescope-type stereomicroscope in a highly simplified manner.

The construction of a telescope-type stereomicroscope is shown as a block diagram in FIG. 1 for purposes of illustration. The stereomicroscope comprises an objective 1 which, according to the invention, comprises a first lens group LG1 and a second lens group LG2 considered from the object 3 being observed which is arranged in an object plane 2. Toward the image side, a magnification changer 8 and 9 and tube lenses 10 and 11, in that sequence, are arranged downstream of the objective 1 in two separate beam paths 6 and 7. The object 3 is imaged in the image plane 12 of the respective beam path 7 and 8 as a real intermediate image 13 and 14. An eyepiece 15 and 16 is provided for observing the intermediate images 13 and 14 in each beam path 6, 7.

As is conventional in stereomicroscopes of the type mentioned above, the two tube systems take two parallel partial bundles from the parallel beam bundles offered by the objective 1. In so doing, an off-axis object point is introduced through the objective into downstream optics, e.g., a magnification changer, into their entrance pupil at an angle ω.

Figure 2:
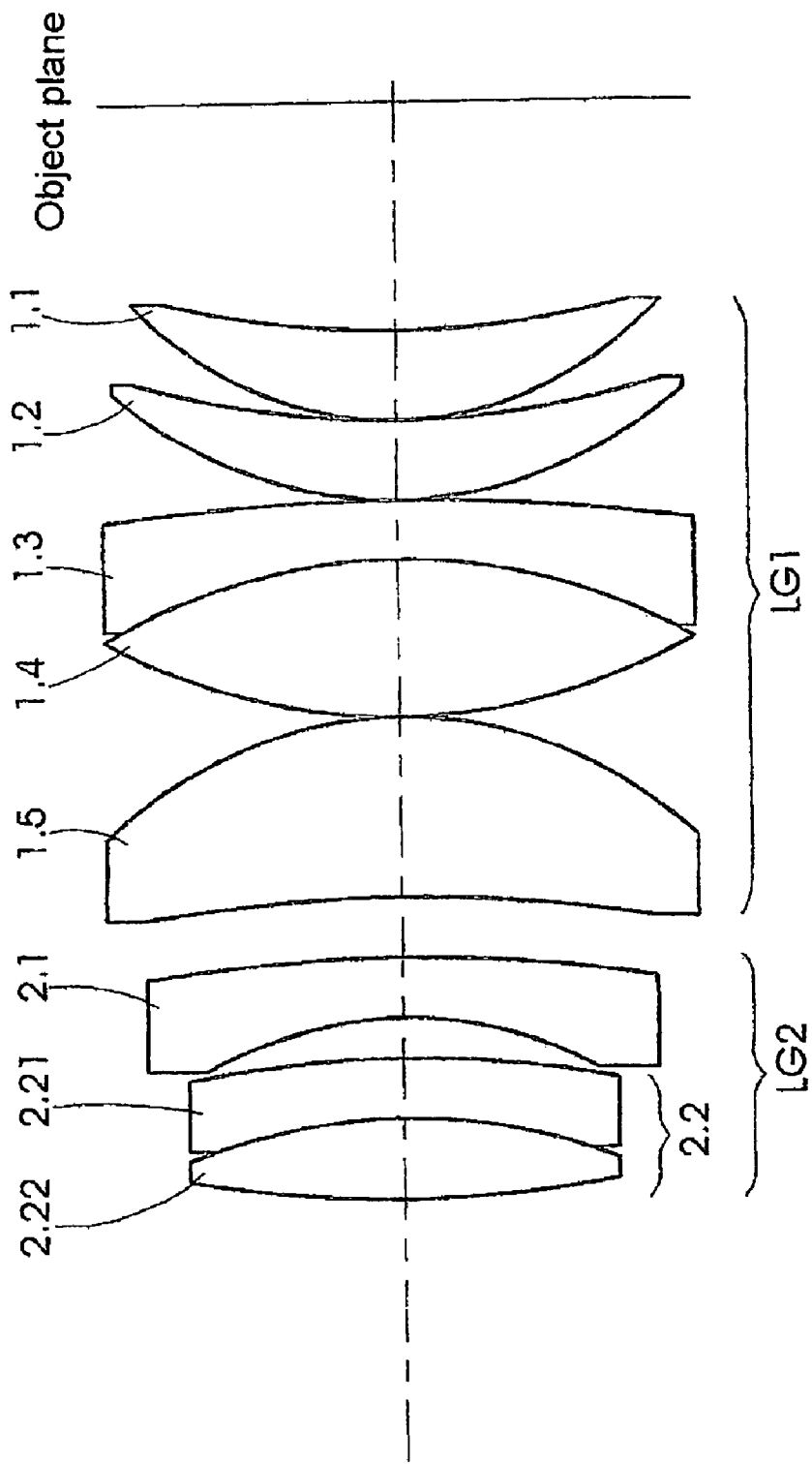
FIG. 2 shows a first embodiment example of an objective.

In the embodiment example shown in FIG. 2, the objective comprises, considered from the object plane in direction of the image plane 12, a first lens group LG1 followed by a second lens group LG2. Lens group LG1 in its entirety has a positive refractive power and lens group LG2 in its entirety has a negative refractive power.

As can further be seen from FIG. 2, the first lens group LG1 comprises five lenses 1.1 to 1.5 of which lenses 1.3 and 1.4 are cemented together to form a cemented component. Lens group LG2 comprises a lens 2.1 with negative refractive power and a cemented component 2.2 with positive refractive power. The cemented group 2.2 comprises another lens 2.21 and a lens 2.22 with positive refractive power. This microscope objective has the following constructional data showing radii r in mm, distances d in mm, refractive indices $n_e$, and Abbe numbers $v_e$:

| Lens | Radius mm | Distance d mm | $n_e$ | $v_e$ |
|---|---|---|---|---|
|  |  | object plane 33.23399 |  |  |
|  | −143.28340 |  |  |  |
| 1.1 |  | 12.70000 | 1.498450 | 81.30 |
|  | −45.64480 |  |  |  |
|  |  | 0.20000 |  |  |
|  | −156.22550 |  |  |  |
| 1.2 |  | 10.00000 | 1.498450 | 81.30 |
|  | −61.77000 |  |  |  |
|  |  | 0.20000 |  |  |
|  | 487.02500 |  |  |  |
| 1.3 |  | 9.00000 | 1.747940 | 44.60 |
|  | 86.59320 |  |  |  |
| 1.4 |  | 21.20000 | 1.498450 | 81.30 |
|  | −86.59320 |  |  |  |
|  |  | 0.20000 |  |  |
|  | 65.55050 |  |  |  |
| 1.5 |  | 22.70000 | 1.498450 | 81.30 |
|  | 334.94300 |  |  |  |
|  |  | 6.71704 |  |  |
|  | 172.77720 |  |  |  |
| 2.1 |  | 9.40000 | 1.584820 | 40.56 |
|  | 48.69730 |  |  |  |
|  |  | 7.59559 |  |  |
|  | 193.86600 |  |  |  |
| 2.21 |  | 6.00000 | 1.607180 | 37.76 |
|  | 79.72170 |  |  |  |
| 2.22 |  | 8.80000 | 1.498450 | 81.30 |
|  | −258.51300 |  |  |  |

This objective 1 has a focal length of 50 mm, an entrance aperture of 55 mm, and an aperture ratio of 1:0.9.

Figure 3:
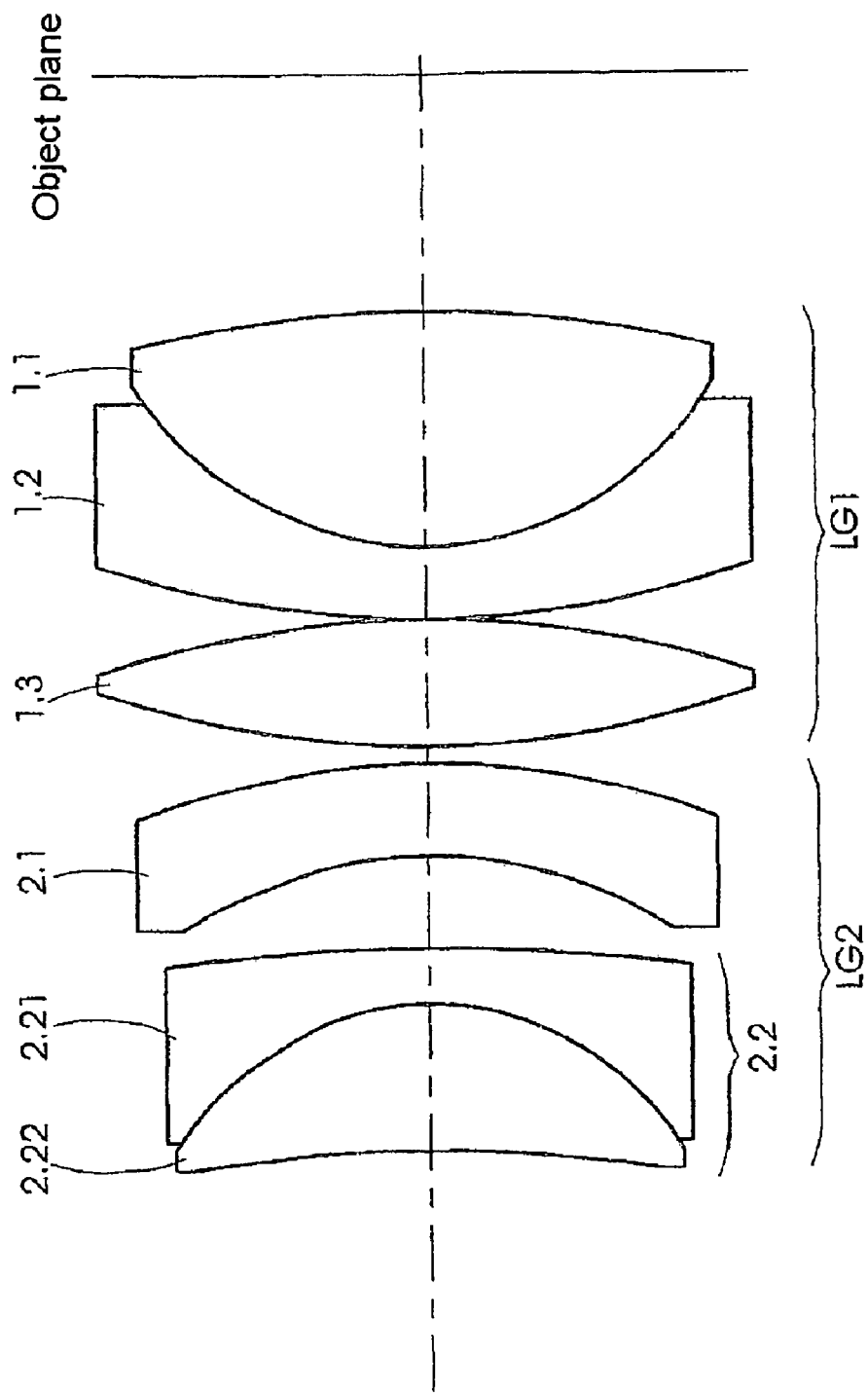
FIG. 3 shows a second embodiment example of an objective.

FIG. 3 shows an example for a second construction of an objective according to the invention. This objective likewise has two lens groups LG1 and LG2. The first, object-side, lens group LG1 has three lenses 1.1 to 1.3 of which lenses 1.1 and 1.2 are cemented together. Lens group LG2 comprises a lens 2.1 with negative refractive power and a cemented component 2.2 with positive refractive power which comprises lenses 2.21 and 2.22.

This microscope objective has the following constructional data showing radii r in mm, distances d in mm, refractive indices $n_e$ and Abbe numbers $v_e$:

| Lens | Radius mm | Distance d mm | $n_e$ | $v_e$ |
|---|---|---|---|---|
|  |  | object plane 81.08262 |  |  |
|  | 109.02830 |  |  |  |
| 1.1 |  | 27.00000 | 1.498450 | 81.05 |
|  | −45.97500 |  |  |  |
| 1.2 |  | 9.70000 | 1.758440 | 52.09 |
|  | −133.35410 |  |  |  |
|  |  | 0.15000 |  |  |
|  | 101.08200 |  |  |  |
| 1.3 |  | 14.70000 | 1.498450 | 81.05 |
|  | −128.62950 |  |  |  |
|  |  | 1.91858 |  |  |
|  | 120.58530 |  |  |  |
| 2.1 |  | 8.70000 | 1.616640 | 44.27 |
|  | 45.64480 |  |  |  |
|  |  | 11.20295 |  |  |
|  | 152.25440 |  |  |  |
| 2.21 |  | 7.80000 | 1.518720 | 63.96 |
|  | 41.86920 |  |  |  |
| 2.22 |  | 14.00000 | 1.622470 | 63.19 |
|  | 613.12200 |  |  |  |

This objective 1 has a focal length of 100 mm, an entrance aperture of 55 mm, and an aperture ratio of 1:1.8.

Figure 4:
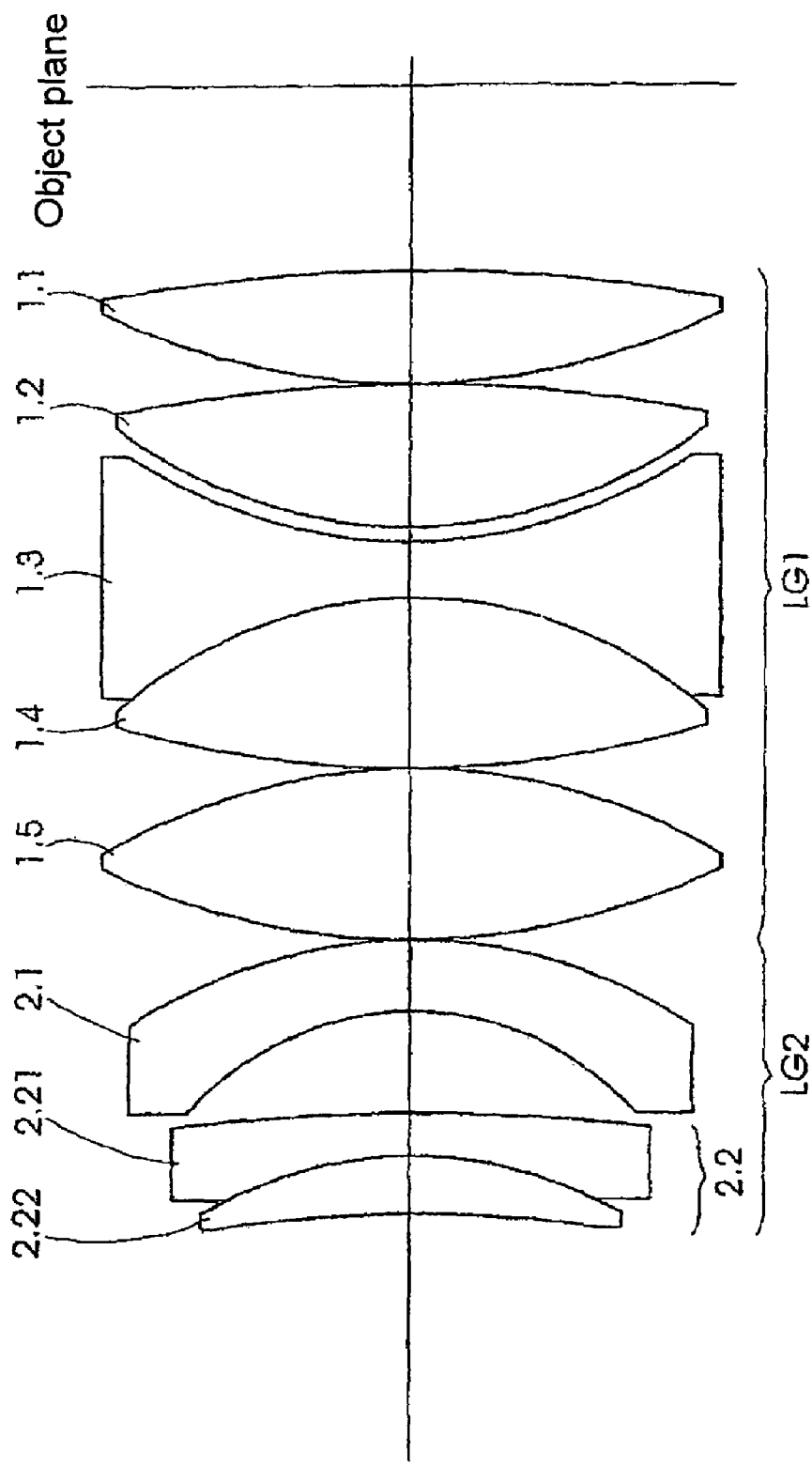
FIG. 4 shows a third embodiment example of an objective.

FIG. 4 shows another objective according to the invention. This third construction of the objective with a focal length f'=80 mm, an entrance aperture of 55 mm and an aperture ratio of 1:1.45 likewise comprises two lens groups LG1 and LG2, wherein, considered from the object space, the first lens group LG1 with positive refractive power comprises two individual lenses 1.1 and 1.2, each with positive refractive power, a cemented group comprising two lenses 1.2 and 1.4, and another lens 1.5 with positive refractive power, and a second lens group LG2 with negative refractive power comprising a lens 2.1 with negative refractive power and a cemented group 2.2 comprising two lenses 2.21 and 2.22.

This microscope objective which is shown in FIG. 4 has the following constructional data showing radii r in mm, distances d in mm, refractive indices $n_e$ and Abbe numbers $v_e$:

| Lens | Radius mm | Distance d mm | $n_e$ | $v_e$ |
|---|---|---|---|---|
|  |  | object plane 61.00000 |  |  |
|  | 330.28404 |  |  |  |
| 1.1 |  | 11.10000 | 1.530190 | 67.58 |
|  | −87.89693 |  |  |  |
|  |  | 0.15000 |  |  |
|  | 179.10180 |  |  |  |
| 1.2 |  | 13.50000 | 1.530190 | 67.58 |
|  | −81.26925 |  |  |  |
|  |  | 2.04381 |  |  |
|  | −76.62790 |  |  |  |
| 1.3 |  | 7.00000 | 1.758440 | 52.10 |
|  | 56.32682 |  |  |  |
| 1.4 |  | 18.70000 | 1.487940 | 80.07 |
|  | −160.14134 |  |  |  |
|  |  | 0.15000 |  |  |
|  | 78.20610 |  |  |  |
| 1.5 |  | 17.40000 | 1.530190 | 67.58 |
|  | −121.89972 |  |  |  |
|  |  | 0.15000 |  |  |
|  | 82.85538 |  |  |  |
| 2.1 |  | 7.0000 | 1.758440 | 52.10 |
|  | 49.22050 |  |  |  |
|  |  | 10.76007 |  |  |
|  | 214.01477 |  |  |  |
| 2.21 |  | 7.0000 | 1.510450 | 60.98 |
|  | 65.99372 |  |  |  |
| 2.22 |  | 7.65175 | 1.622860 | 60.08 |
|  | 276.92831 |  |  |  |

This objective 1 has a focal length of 80 mm, an entrance aperture of 55 mm, and an aperture ratio of 1:1.45.

Figure 5:
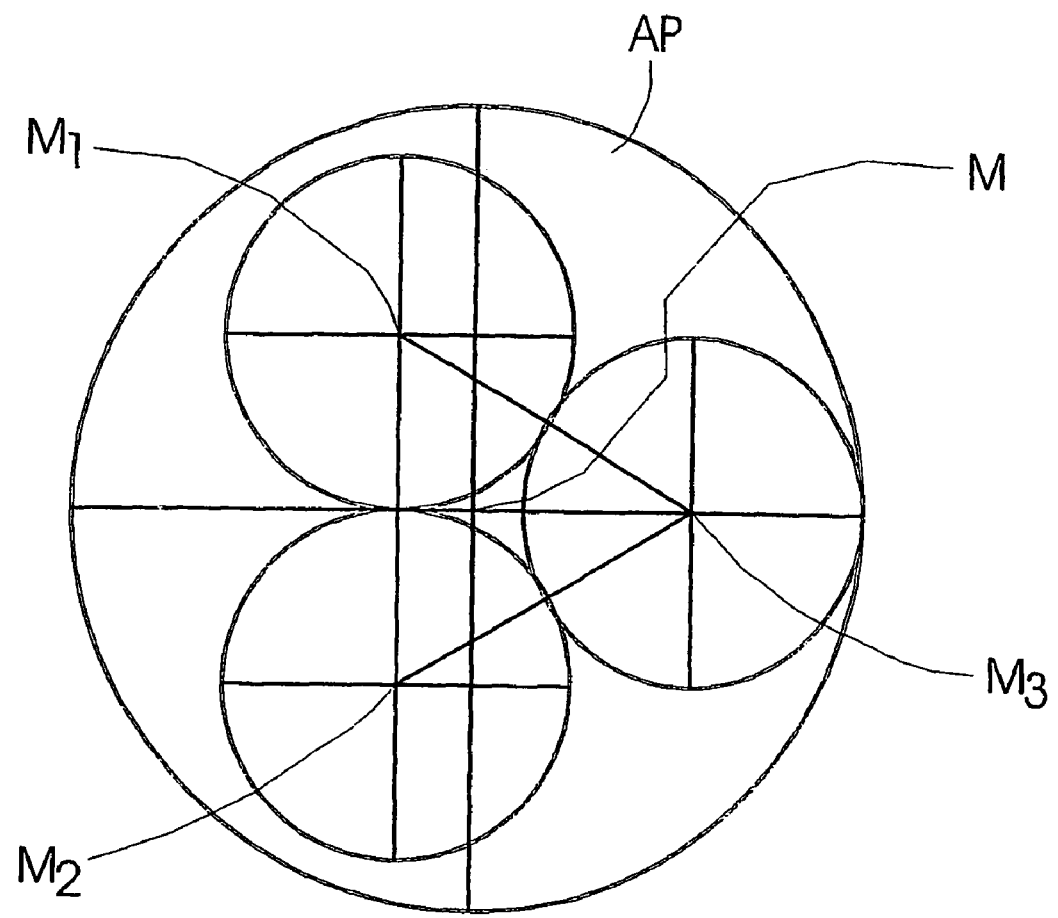
FIG. 5 shows the arrangement of the different pupils in the objective pupil.

FIG. 5 shows the position of the different pupils in the exit pupil AP. These are the pupils having center points $M_1$ and $M_2$ of the two observation beam paths of the stereomicroscope and the entrance pupil $M_3$ of the illumination beam path which is coupled into the exit pupil AP of the objective 1. These three pupils, whose center points are designated by $M_1$, $M_2$ and $M_3$, are arranged in the exit pupil AP in such a way that their center points $M_1$, $M_2$ and $M_3$ form an isosceles triangle, and center point M of the exit pupil AP lies within this triangle, where the following conditions must be met:

$$0.25 \leq a_1/D_{AP} \leq 0.5$$

$$0.25 \leq a_2/D_{AP} \leq 0.5.$$

$$0.25 \leq a_3/D_{AP} \leq 0.5,$$

where $a_1$ and $a_2$ are the distances of the center points $M_1$ and $M_2$ of the two beam paths of the objective 1 from the center point M of the exit pupil AP of the objective 1, and $a_3$ is the distance of the center point $M_3$ of the entrance pupil of the illumination beam path from the center point M of the exit pupil AP of the objective 1.

Figure 6:
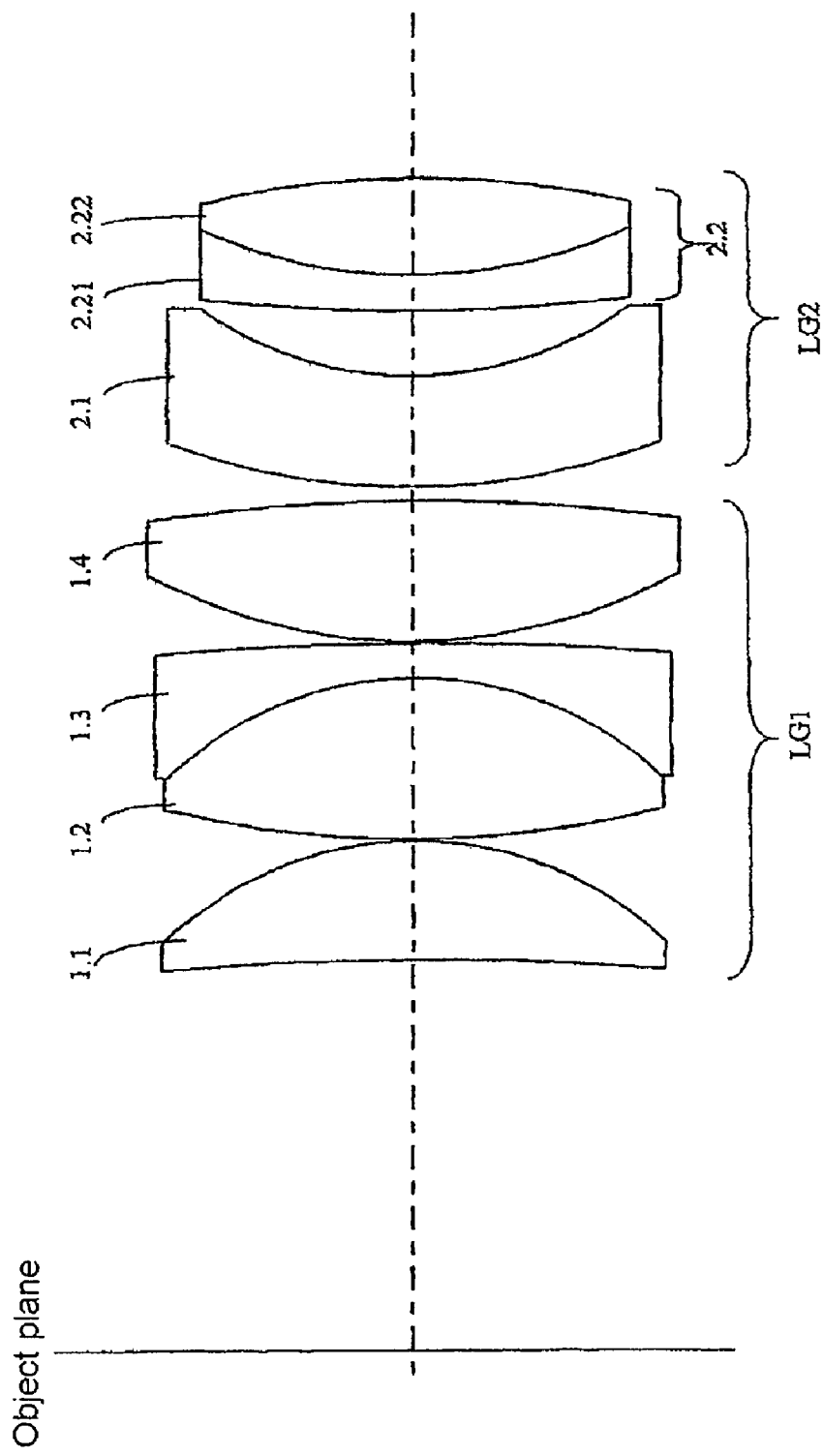
FIG. 6 shows a fourth embodiment example of an objective.

FIG. 6 shows another objective according to the invention. This fourth construction of the objective with a focal length f'=65.59 mm, an entrance aperture of 53.5 mm and an aperture ratio of 1:1.23 likewise comprises two lens groups LG1 and LG2, wherein, considered from the object space, the first lens group LG1 with positive refractive power comprises an individual lens 1.1 with positive refractive power, a cemented group with negative refractive power comprising two lenses 1.2 and 1.3, and another lens 1.4 with positive refractive power, and a second lens group LG2 with negative refractive power comprising a lens 2.1 with negative refractive power and a cemented group 2.2 comprising two lenses 2.21 and 2.22.

This microscope objective which is shown in FIG. 6 has the following constructional data showing radii r in mm, distances d in mm, refractive indices $n_e$ and Abbe numbers $v_e$:

| Lens | Radius mm | Distance d mm | $n_e$ | $v_e$ |
|---|---|---|---|---|
|  |  | object plane |  |  |
|  |  | 49.60000 |  |  |
|  | −378.759 |  |  |  |
| 1.1 |  | 15.00000 | 1.4980 | 81:1 |
|  | −46.980 |  |  |  |
|  |  | 0.21000 |  |  |
|  | 135.296 |  |  |  |
| 1.2 |  | 20.50000 | 1.440 | 94.6 |
|  | −46.308 |  |  |  |
| 1.3 |  | 4.50000 | 1.716 | 53.6 |
|  | −415.764 |  |  |  |
|  |  | 0.20000 |  |  |
|  | 71.814 |  |  |  |
| 1.4 |  | 17.90000 | 1.440 | 94.6 |
|  | −254.821 |  |  |  |
|  |  | 1.77000 |  |  |
|  | 89.771 |  |  |  |
| 2.1 |  | 14.40000 | 1.489 | 70.2 |
|  | 48.347 |  |  |  |
|  |  | 8.20000 |  |  |
|  | 237.162 |  |  |  |
| 2.2 |  | 4.50000 | 1.716 | 53.6 |
|  | 68.294 |  |  |  |
| 2.3 |  | 12.20000 | 1.498 | 81.1 |
|  | −125.885 |  |  |  |
|  |  | 0.40000 |  |  |

This objective 1 has a focal length of 65.59 mm, an entrance aperture of 53.5 mm, and an aperture ratio of 1:1.23.

In this objective, the focal length of the second lens group satisfies the following condition:

$$-0.0668*f'^2 + 7.4933*f' - 780 \leq f'_2 \leq -0.0668 f'^2 + 7.4933*f' - 400,$$

where $f'_2$ is the focal length of the second lens group and f' is the total focal length of the objective 1.

The cemented component of the second lens group meets the condition:

$$10^{-8}*f'^2 + 9*10^{-8}*f' - 1.8*10^{-4} \leq 1/f_1/v_{e1} + 1/f_2/v_{e2} \leq 10^{-8}*f'^2 + 9*10^{-8}*f' - 10^{-4},$$

and the lens (2.1) of the lens group meets the condition $v_{e3} \leq 55$, where $f'_1$ is the focal length of lenses 2.22, $f'_2$ is the focal length of lenses 2.21, f' is the total focal length of the objective, $v_{e1}$ and $v_{e2}$ are the Abbe numbers of lenses 2.22 and 2.21, and $v_{e3}$ is the Abbe number of lens 2.1.

This fourth construction of the objective is distinguished above all in that it is apochromatically corrected and also has a high transmission in the near UV spectral region.

While the foregoing description and drawings represent the present invention, it will be obvious to those skilled in the art that various changes may be made therein without departing from the true spirit and scope of the present invention.

The invention claimed is:

1. An objective, particularly for telescope-type stereomicroscopes, wherein the objective comprises two lens groups of which, considered from the object plane, a first lens group with positive refractive power is next to the object plane and a second lens group with negative refractive power is next to optics arranged downstream, wherein the following conditions are met:

$$46.5 < D_{AP} \leq 60; \text{ and} \qquad B_1$$

$$0.16 \leq \tan \omega_1; \qquad B_2$$

where $D_{AP}$ represents the diameter of the exit pupil of the objective and $\omega_1$ represents the maximum entrance angle in the downstream optics.

2. The objective according to claim 1;
wherein the focal length of the objective is $f' \geq 40$ mm and $\leq 200$ mm.

3. The objective according to claim 1;
wherein the illumination beam path is coupled into the exit pupil of the objective.

4. The objective according to claim 3;
wherein the center point of the entrance pupil of the illumination beam path and the center points of the two beam paths of the objective form an isosceles triangle inside the exit pupil of the objective, the center point of the exit pupil lying inside this triangle.

5. The objective according to claim 4;
wherein the following conditions are met:

$$0.25 \leq a_1/D_{AP} \leq 0.5;$$

$$0.25 \leq a_2/D_{AP} \leq 0.5;$$

$$0.25 \leq a_3/D_{AP} \leq 0.5;$$

where $a_1$ and $a_2$ are the distances of the center points of the two beam paths of the objective from the center point of the exit pupil of the objective, and $a_3$ is the distance of the center point of the entrance pupil of the illumination beam path from the center point of the exit pupil of the objective.

6. The objective according to claim 1;
wherein the focal length of this second lens group satisfies the following condition:

$$-0.0668*f'^2+7.4933*f'-460 \leq f'_2 \leq -0.0668f'^2+7.4933*f'-400,$$

where f'2 is the focal length of the second lens group and f' is the total focal length of the objective.

7. The objective according to claim 1;
wherein the second lens group comprises a cemented component and an individual lens, and the cemented component is arranged next to the magnification changer; and
wherein the focal length of this second lens group satisfies the following condition:

$$-0.0668*f'^2+7.4933*f'-460 \leq f'_2 \leq -0.0668f'^2+7.4933*f'-400,$$

where f'2 is the focal length of the second lens group and f' is the total focal length of the objective.

8. The objective according to claim 7;
wherein the cemented component of the second lens group meets the condition:

$$10^{-8}*f'^2+9*10^{-8}*f'-10^{-4} \leq 1/f_1/v_{e1}+1/f_2/v_{e2} \leq 10^{-8}*f'^2+9*10^{-8}*f'-10^{-4},$$

and lens (2.1) of this lens group meets the condition $v_{e3} \leq 55$, where $f'_1$ is the focal length of the lenses (2.22), $f'_2$ is the focal length of the lenses (2.21), f' is the total focal length of the objective, $v_{e1}$ and $v_{e2}$ are the Abbe numbers of the lenses (2.22 and 2.21), and $v_{e3}$ is the Abbe number of the lens (2.1).

9. The objective according to claim 1;
wherein the first lens group has a positive refractive power and comprises a plurality of lenses of which at least two form a cemented component; and
wherein the second lens group has a negative refractive power and comprises a collecting cemented component and a dispersing lens.

10. The microscope objective according to claim 1;
wherein the first lens group includes lenses 1.1, 1.2, 1.3, 1.4, and 1.5 and the second lens group includes lenses 2.1, 2.21, and 2.22, according to the constructional data in the following table:

| Lens | Radius mm | Distance d mm | $n_e$ | $v_e$ |
|---|---|---|---|---|
| | | object plane 33.23399 | | |
| | −143.28340 | | | |
| 1.1 | | 12.70000 | 1.498450 | 81.30 |
| | −45.64480 | | | |
| | | 0.20000 | | |
| | −156.22550 | | | |
| 1.2 | | 10.00000 | 1.498450 | 81.30 |
| | −61.77000 | | | |
| | | 0.20000 | | |
| | 487.02500 | | | |
| 1.3 | | 9.00000 | 1.747940 | 44.60 |
| | 86.59320 | | | |
| 1.4 | | 21.20000 | 1.498450 | 81.30 |
| | −86.59320 | | | |
| | | 0.20000 | | |
| | 65.55050 | | | |
| 1.5 | | 22.70000 | 1.498450 | 81.30 |
| | 334.94300 | | | |
| | | 6.71704 | | |
| | 172.77720 | | | |

-continued

| Lens | Radius mm | Distance d mm | $n_e$ | $v_e$ |
|---|---|---|---|---|
| 2.1 | | 9.40000 | 1.584820 | 40.56 |
| | 48.69730 | | | |
| | | 7.59559 | | |
| | 193.86600 | | | |
| 2.21 | | 6.00000 | 1.607180 | 37.76 |
| | 79.72170 | | | |
| 2.22 | | 8.80000 | 1.498450 | 81.30 |
| | −258.51300 | | | | where d represents the distances between the lenses, $n_e$ represents the refractive indices, and $v_e$ represents the Abbe number of the glass; and
wherein the objective has the following performance parameters:
focal length f'=50 mm;
entrance aperture 55 mm; and
aperture ratio 1:0.9.

11. The microscope objective according claim 1;
wherein the first lens group includes lenses 1.1, 1.2, and 1.3 and the second lens group includes lenses 2.1, 2.2, and 2.3, according to the constructional data in the following table:

| Lens | Radius mm | Distance d mm | $n_e$ | $v_e$ |
|---|---|---|---|---|
| | | object plane 81.08262 | | |
| | 109.02830 | | | |
| 1.1 | | 27.00000 | 1.498450 | 81.05 |
| | −45.97500 | | | |
| 1.2 | | 9.70000 | 1.758440 | 52.09 |
| | −133.35410 | | | |
| | | 0.15000 | | |
| | 101.08200 | | | |
| 1.3 | | 14.70000 | 1.498450 | 81.05 |
| | −128.62950 | | | |
| | | 1.91858 | | |
| | 120.58530 | | | |
| 2.1 | | 8.70000 | 1.616640 | 44.27 |
| | 45.64480 | | | |
| | | 11.20295 | | |
| | 152.25440 | | | |
| 2.21 | | 7.80000 | 1.518720 | 63.96 |
| | 41.86920 | | | |
| 2.22 | | 14.00000 | 1.622470 | 63.19 |
| | 613.12200 | | | | where d represents the distances between the lenses in mm, $n_e$ represents the refractive indices, and $v_e$ represents the Abbe number of the glass; and
wherein the objective having the following performance parameters:
focal length f'=100 mm;
entrance aperture 55 mm; and
aperture ratio 1:1.8.

12. The microscope objective according claim 1;
wherein the first lens group includes lenses 1.1, 1.2, 1.3, 1.4, and 1.5 and the second lens group includes lenses 2.1, 2.21, and 2.22, according to the constructional data in the following table:

| Lens | Radius mm | Distance d mm | $n_e$ | $v_e$ |
|---|---|---|---|---|
| | | object plane 61.00000 | | |
| | 330.28404 | | | |
| 1.1 | | 11.10000 | 1.530190 | 67.58 |
| | −87.89693 | | | |
| | | 0.15000 | | |
| | 179.10180 | | | |
| 1.2 | | 13.50000 | 1.530190 | 67.58 |
| | −81.26925 | | | |
| | | 2.04381 | | |
| | −76.62790 | | | |
| 1.3 | | 7.00000 | 1.758440 | 52.10 |
| | 56.32682 | | | |
| 1.4 | | 18.70000 | 1.487940 | 80.07 |
| | −160.14134 | | | |
| | | 0.15000 | | |
| | 78.20610 | | | |
| 1.5 | | 17.40000 | 1.530190 | 67.58 |
| | −121.89972 | | | |
| | | 0.15000 | | |
| | 82.85538 | | | |
| 2.1 | | 7.0000 | 1.758440 | 52.10 |
| | 49.22050 | | | |
| | | 10.76007 | | |
| | 214.01477 | | | |
| 2.21 | | 7.0000 | 1.510450 | 60.98 |
| | 65.99372 | | | |
| 2.22 | | 7.65175 | 1.622860 | 60.08 |
| | 276.92831 | | | | where d represents the distances between the lenses in mm, $n_e$ represents the refractive indices, and $v_e$ represents the Abbe number of the glass;

wherein the objective having the following performance parameters:

focal length f'=80 mm;

entrance aperture 55 mm; and aperture ratio 1:1.45.

13. The microscope objective according claim 1;

wherein the first lens group includes lenses 1.1, 1.2, 1.3, and 1.4 and the second lens group includes lenses 2.1, 2.2, and 2.3, according to the constructional data in the following table:

| Lens | Radius mm | Distance d mm | $n_e$ | $v_e$ |
|---|---|---|---|---|
| | | object plane 49.60000 | | |
| | −378.759 | | | |
| 1.1 | | 15.00000 | 1.4980 | 81.1 |
| | −46.980 | | | |
| | | 0.21000 | | |
| | 135.29e6 | | | |
| 1.2 | | 20.50000 | 1.440 | 94.6 |
| | −46.308 | | | |
| 1.3 | | 4.50000 | 1.716 | 53.6 |
| | −415.764 | | | |
| | | 0.20000 | | |
| | 71.814 | | | |
| 1.4 | | 17.90000 | 1.440 | 94.6 |
| | −254.821 | | | |
| | | 1.77000 | | |
| | 89.771 | | | |
| 2.1 | | 14.40000 | 1.489 | 70.2 |
| | 48.347 | | | |
| | | 8.20000 | | |
| | 237.162 | | | |
| 2.2 | | 4.50000 | 1.716 | 53.6 |
| | 68.294 | | | |
| 2.3 | | 12.20000 | 1.498 | 81.1 |
| | −125.885 | | | |
| | | 0.40000 | | | where d represents the distances between the lenses in mm, $n_e$ represents the refractive indices, and $v_e$ represents the Abbe number of the glass; and wherein the objective having the following performance parameters:

focal length f'=65.59 mm;

entrance aperture 53.5 mm; and aperture ratio 1:1.23.

14. The objective according to claim 1, comprising its application in fluorescence stereomicroscopes.

15. An objective, particularly in fluorescence stereomicroscopes, having the condition:

$\tau(350;5)_j \geq 0.8;$ where $\tau(350; 5)_j$ is the internal transmission at a wavelength of the light of 350 nm and a substrate thickness of 5 mm, and an index j=1, 2, . . . stands for all optical media of the objective.

* * * * *

UNITED STATES PATENT AND TRADEMARK OFFICE
CERTIFICATE OF CORRECTION

PATENT NO. : 7,643,216 B2  Page 1 of 1
APPLICATION NO. : 11/664553
DATED : January 5, 2010
INVENTOR(S) : Johannes Winterot et al.

It is certified that error appears in the above-identified patent and that said Letters Patent is hereby corrected as shown below:

On the Title Pg Item (73):

Please correct the Assignee from "Carl Zeiss Microimaging GmbH" to --Carl Zeiss MicroImaging GmbH--

Signed and Sealed this

Twenty-fifth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,643,216 B2 | Page 1 of 2 |
| APPLICATION NO. | : 11/664553 | |
| DATED | : January 5, 2010 | |
| INVENTOR(S) | : Winterot et al. | |

It is certified that error appears in the above-identified patent and that said Letters Patent is hereby corrected as shown below:

On the Title Page: item (30),
Foreign Application Priority Data:

Please add the --DE 10 2004 048.299.3 Filed 10/2/2004--

Item (57); In the Abstract:

Line 10, please add

--$B_1$:  $46.5 < D_{AP} \leq 60$ and--
--$B_2$:  $0.16 \leq \tan \omega_1$,--

In Claim 1, Column 8:

Lines 8 to 9, please amend
"$46.5 < D_{AP} \leq 60$ and    $B_1$:"
"$0.16 \leq \tan \omega_1$,           $B_2$:"

To read

--$B_1$:  $46.5 < D_{AP} \leq 60$; and--
--$B_2$:  $0.16 \leq \tan \omega_1$;--

In Claim 6, Column 9:

Line 6 please amend "f2" to read --$f'_2$--

Signed and Sealed this
Eighth Day of November, 2011

David J. Kappos
*Director of the United States Patent and Trademark Office*

CERTIFICATE OF CORRECTION (continued)
U.S. Pat. No. 7,643,216 B2

<u>In Claim 7, Column 9</u>

Lines 10 please change "f2" to read --$f'_2$--

<u>In Claim 13, Column 12</u>

In the table, it read <u>Radius mm</u> "135.29e6" should read --135.296--